United States Patent Office 3,606,958
Patented Sept. 21, 1971

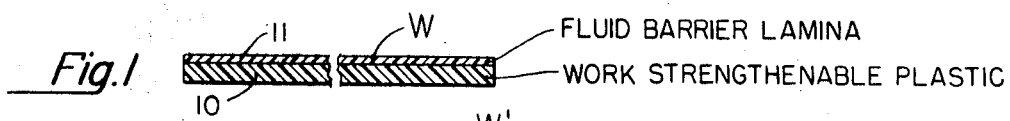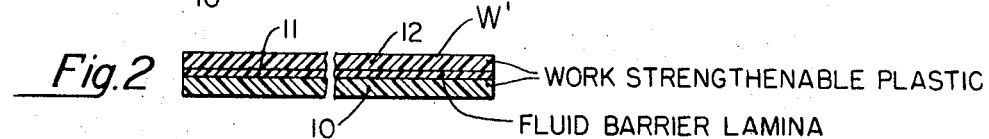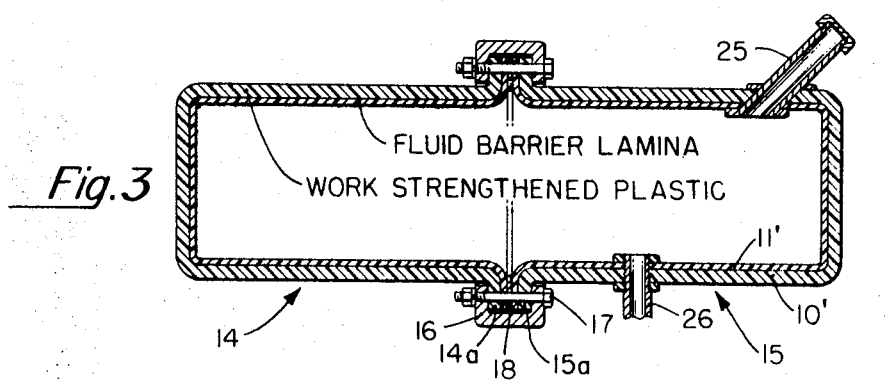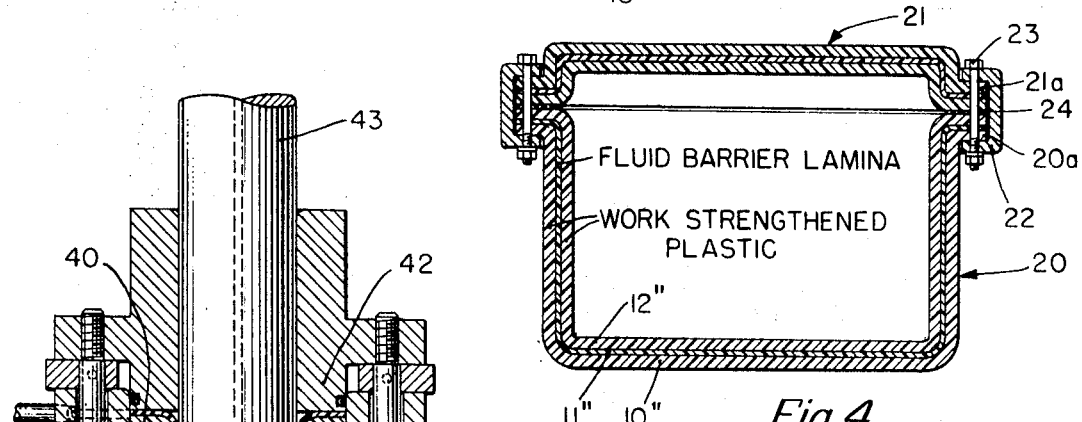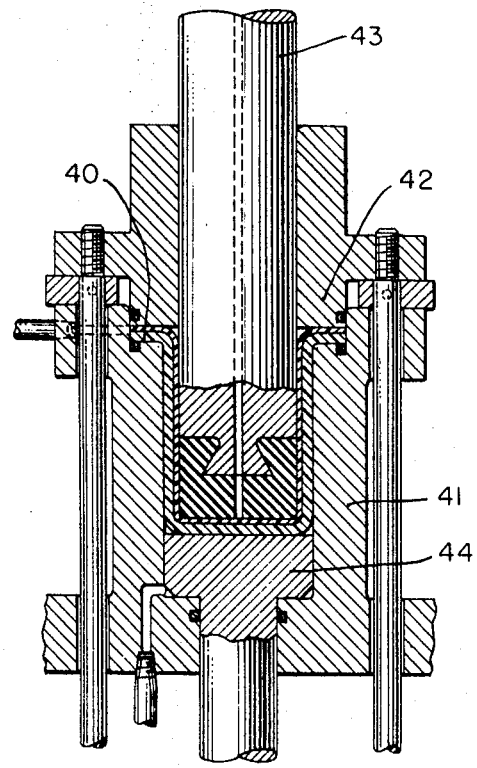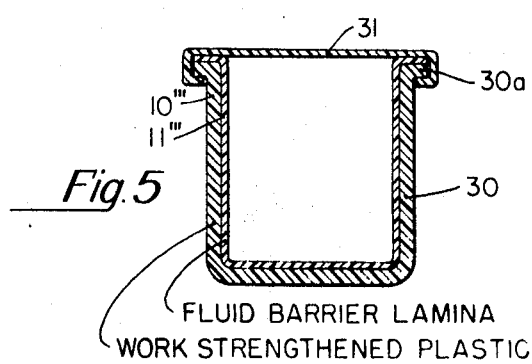

3,606,958
LAMINATED FLUID-BARRIER CONTAINER AND METHOD OF MAKING IT
Paul M. Coffman, Cherry Hill, N.J., assignor to Shell Oil Company, New York, N.Y.
Filed May 17, 1968, Ser. No. 729,977
Int. Cl. B65d 85/72, 89/16; B64d 37/02
U.S. Cl. 220—63
8 Claims

ABSTRACT OF THE DISCLOSURE

This application discloses a laminated fluid-barrier container and method of making it, particularly a container having a cold-work-strengthened fiber-oriented load-carrying plastic lamina or layer and another lamina or layer which forms a highly effective barrier against the passage of fluids, especially such fluids as oxygen and aromatic vapors. Such containers are especially suitable for foods, where oxygen entry causes spoilage, for gas tanks where vapor passage causes fuel loss and air pollution, and for similar uses.

The container body is formed by stretch-forming a laminated blank or workpiece in the solid-phase condition to cause cold-work-strengthening and fiber-orientation of the load-carrying lamina of the container and to stretch the fluid-barrier lamina along with the load-carrying lamina. Contact between laminae is assured by excluding air and using bonding material between laminae if desired.

BACKGROUND OF THE INVENTION

There is a rapidly increasing trend toward the use of plastics for many kinds of material-carrying containers. One class of such materials for which suitable plastic containers are sought is foods. Most foods are injured by oxygen contact and many plastic containers which have been used are permeable to oxygen to an objectionable extent. What appears to be needed is a strong plastic container which is also highly impermeable to oxygen, moisture, and other fluids which can cause food spoilage.

Another class of materials for which suitable plastic containers are sought is petroleum products, particularly gasoline. Gasoline tanks for automobiles offer a large potential market for plastics; but many plastics which have been proposed are too permeable to the aromatic vapors to be acceptable. Any escape of gasoline vapor is an economic loss and adds so greatly to the air pollution problem that it cannot be tolerated.

PRIOR ART

Much work has been done to minimize fluid permeation through container walls. Much of this work has been devoted to the provision of coatings for metal or other load-bearing walls. With plastics, the usual commercially available and workable plastic materials do not have the desired degree of impermeability; and the plastics which do have the desired degree of impermeability are commercially unsuitable for other reasons, such as prohibitive cost, lack of wall strength, unfavorable forming characteristics, and the like.

There have been some proposals for forming barrier walls of laminates but those which are known form containers from materials at temperatures above the work-strengthenable temperature, as by blowing, casting or the like, and the container walls do not have sufficient strength in comparison to wall thickness to be as economical as desirable.

Means and method for stretch-forming thermoplastic materials in the solid state are disclosed in the copending application of Herbert G. Johnson, S.N. 601,380, filed Dec. 13, 1966 (common assignee) now U.S. 3,499,188.

SUMMARY OF INVENTION

According to the present invention, containers are made with laminated plastic polymer walls in which one lamina is a relatively inexpensive strong load-carrying plastic polymer material and another lamina is a highly impermeable plastic polymer or other suitable barrier material, the laminae being formed together by a stretch-forming process to produce a container in which at least the relatively thick load-bearing lamina is cold-work-strengthened with fiber orientation in at least one axis, preferably in two axes (biaxial), and in which the more impermeable relatively thin lamina is stretched without rupture so as to be fully coextensive with the load-bearing lamina in the finished container. In this way it is possible to use the highly impermeable materials in laminates; whereas they might not be readily formable alone, if at all. They can also be used in relatively thin and inexpensive sections, as for example, $\frac{1}{10}$ to $\frac{1}{100}$ of the thickness of the load-bearing lamina; whereas they might be too expensive or weak to be used alone. The more impermeable materials are compatible with the load-bearing materials to the extent that they may be heated to the desired solid-working temperatures of the load-bearing materials without losing their coherent integrity and stretchability or rupturing during formation. The load-bearing materials are solid-formed preferably within a few degrees of their melting point, hence the fluid barrier materials need to have coherent integrity to a temperature which is at least as high as that of the load-bearing lamina material.

DRAWINGS

The invention will be described in connection with the accompanying drawings, wherein:

FIG. 1 is a section through a two-laminae blank suitable for forming a container having a cold-work-strengthened fiber-oriented load-bearing lamina and a fluid barrier lamina;

FIG. 2 is a similar section of a three-laminae blank with the middle fluid-barrier lamina sandwiched between inner and outer load-bearing laminae;

FIG. 3 is a section through an illustrative form of gasoline tank made in accordance with the invention;

FIG. 4 is a section through another form of tank;

FIG. 5 is a section through a container, as for food, made in accordance with the invention;

FIG. 6 is a section through a forming press for making a container body in accordance with the invention.

SPECIFIC EMBODIMENTS

Referring to the drawings, FIG. 1 shows a laminated blank having a relatively thick load-carrying lamina 10 of cold-work-strengthenable fiber-orientable plastic polymer material and a relatively thin layer 11 of ductile fluid-barrier material. Care is taken to exclude air from the space between laminae, as for example, by air removal, under vacuum if desired, or by using bonding adhesive between laminae. It has been found that if air is carefully excluded the laminae in the finished product act almost as if they had been bonded together and are difficult to separate even when no bonding adhesive is used; but the use of bonding adhesive gives greater assurance against ply separation, of course.

In the form shown in FIG. 2 the blank has three laminae, the fluid-barrier lamina 11 being sandwiched between load-bearing laminae 10 and 12.

The showing of these forms with two or three laminae is merely representative and there may be as many laminae as desired and as many different materials as desired.

FIG. 3 shows a representative form of gasoline fuel tank for an automobile made up of laminated container parts 14 and 15 having flanges 14a and 15a secured together by a U-shaped ring 16 and bolts 17, a gasket or adhesive 18 preferably being used between flanges. Here there is an outer load-carrying lamina 10' and an inner fluid-barrier lamina 11'. Each part 14, 15 is stretch-formed in a manner to be described to cold-work-strengthen and fiber-orient the material of at least the load-carrying lamina 10' and to stretch-form the fluid barrier lamina 11' along with it.

FIG. 4 shows a representative form of tank made up of laminated container parts 20 and 21 having flanges 20a and 21a secured together by a U-shaped ring 22 and bolts 23, adhesive or gasket 24 preferably being used between flanges. Here there is an outer load-bearing lamina 10", an inner load-bearing lamina 12", and an intermediate fluid-barrier lamina 11". Each part 20, 21 is stretch-formed, in this case one part 20 being relatively deep to form the main body of the tank and the other part 21 being relatively shallow to form a top or cover.

In FIG. 3 the parts 14, 15 are identical and in FIG. 4 the parts 20, 21 are identical in outline but of different depth; in either case the same forming apparatus being capable of making both parts. FIG. 3 shows how a fill tube 25 and a feed-out tube 26 can be provided on the tank, the showing of accessory tubes or openings being omitted from FIG. 4.

FIG. 5 shows what may be used as a food can 30 made by stretch-forming a laminate comprised of a load-bearing outer lamina 10''' and an inner fluid-barrier lamina 11'''. Here a simple single-thickness cover 31 can be crimp-sealed around the flange 30a of the container. Since the cover is supposed to be less contacted by the product in the can than is the main body portion 30, it may be made of another type of plastic or even of metal or other suitable material which has a non-injurious inner surface presented to the product.

FIG. 6 shows how a laminated container part, as 30, may be formed in accordance with the Johnson method by clamping the periphery of a laminated blank W (FIG. 1) on an annular holddown seat 40 of a die-mold 41 by an annular hold-down plunger 42 and forcing the inner part of the blank by a main forming plunger 43 into the space of the die-mold 41. The bottom and sidewall of the container are stretch-formed in this action to cold-work-strengthen and fiber-orient the material in this action. A bottom opposing plunger 44 and the annular clearance between the forming plunger 42 and the top opening of the die-mold assist in the proper draw-out of material of the blank. Temperature conditions are maintained to keep the material a few degrees below the melting point of the material forming the load-bearing lamina 10. The hold-down plunger is arranged to give sufficient action to thin and cold-work-strengthen the rim of the container, if desired. The press parts may have blank-engaging surface material and there are fluid ducts provided for controlling to a considerable extent the degree of friction of the press parts with the blank.

Materials suitable for the load-carrying lamina or layer in general are the work-strengthenable fiber-orientable thermo-plastic materials of the poly-olefin group and some other thermo-plastic materials having similar characteristics in the respect of formability and work-strengthening.

One suitable material is polypropylene of commerce, exemplified by isotactic propylene. Another is polyvinyl chloride (PVC), which incidentally is itself a good fluid barrier material. Some others are: polyvinylidene chloride (sarans), acrylonitrile-butadiene-styrene (ABS), polyamides (nylons, etc.), polystyrene, fluorocarbon polymers (fluoroplastics), acrylic polymers, cellulose acetate, cellulose butyrate, cellulose nitrate, polycarbonate, polyester, polyphenylene oxide (PPO), polysulfone, polyurethane, and possibly others which have not yet been investigated.

Materials suitable for fluid-barrier laminae include polyamides, polyhydroxy ethers (including phenoxy and the polymers disclosed in U.S. 3,306,872), polyvinyl chlorides, polyvinylidene chlorides, and for some uses even ductile metals in thin sections, such as lead, tin, soft copper, aluminum, and the like. For very exacting uses gold in very thin laminae might be considered.

The above-named types of polymers are well known and need no further identification than their generic names. Each type includes well established materials of commerce. Their chemical compositions and physical properties are described in standard reference works such as "Modern Plastics Encyclopedia" and "The Encyclopedia of Chemical Technology" by Kirk and Othmer. Further details are given in the patent literature and in publications provided by the manufacturers of the commercial plastics. It is understood that the generic term for many of the named polymers, for example polyvinyl chloride, polyvinylidene chloride, polystyrene, polyethylene and polypropylene, includes both homopolymers and copolymers of the predominant monomers with minor amounts of other monomers.

The factor of oxygen permeability of various materials is given in available tables and permeability to other fluids such as aromatic vapors will generally correspond in relative magnitude to that for oxygen. The factor for polypropylene is given as about 200 (specified as 200 cc.-mil/100 in.$^2$/24 hr./atm.); the factor for polyvinyl chloride is given as about 15, for sarans 1 or less, for phenoxy about 5, and for nylons a low value.

One suitable laminated structure would comprise one or more layers of polypropylene (such as 5220 Shell) in a thickness of 5 to 100 mils and a layer of phenoxy in a thickness of 0.15 to 10 mils. For heavier structures it is possible to have greater thicknesses of each, large laminated blanks up to ½" total thickness having been formed. A convenient range is to have a barrier lamina which is about $1/10$ the thickness of the load-bearing lamina.

If the barrier layer inhibits easy formation when engaged by the press surfaces, it is found that the situation is greatly relieved by having the barrier lamina sandwiched between load-carrying laminae which have an easier action with the press surfaces, as in FIGS. 2 and 4.

It has been found that a container made in accordance with the present invention is conveniently formable even where fluid-barrier materials alone would be difficult or impossible to form; also that the containers have great strength in comparison to weight and are highly impermeable to fluids which readily pass through the usual load-bearing plastic materials.

While certain embodiments of the invention have been described for purposes of illustration, it is to be understood that there may be various other embodiments and modifications within the general scope of the invention.

I claim:
1. A container having a wall of co-formed laminae, said wall being highly impermeable to fluids selected from the group consisting of oxygen and aromatic vapors, said wall comprising a first load-carrying lamina of a linear polyolefin polymer plastic material, said load-carrying lamina having been formed in the solid phase by a stretch forming process to cause strengthening with orientation of said load carrying lamina in at least one axis; and a second sealing lamina coextensive with the load-bearing lamina, and being a member selected from the group consisting essentially of a polyamide, polyvinyl chloride, polyvinylidine chloride and a polyhydroxyether.

2. A container as in claim 1 wherein said sealing lamina is highly impermeable to oxygen to make the container especially suitable for food preservation.

3. A container as in claim 1 wherein said sealing lamina is highly impermeable to aromatic vapor to make the container especially suitable for volatile fuels.

4. A container as in claim 1 wherein said sealing lamina is disposed on the side of the wall which is adjacent to the contained substance.

5. A container as in claim 1 wherein said sealing lamina is sandwiched between laminae of load-carrying material.

6. A container as in claim 1 wherein said first load-carrying lamina consists essentially of polypropylene.

7. A container as in claim 1 wherein the thickness of said sealing lamina is in the range of 1/10 to 1/100 of the thickness of said load-bearing lamina.

8. A container as in claim 1 wherein the first load-carrying lamina is polypropylene and the second sealing lamina is a polyhydroxyether.

References Cited

UNITED STATES PATENTS

| | | | |
|---|---|---|---|
| 1,376,216 | 4/1921 | Mittinger | 220—5 |
| 2,698,042 | 12/1954 | Perkins | 152—362 |
| 2,802,763 | 8/1957 | Freedlander | 280—5X |
| 2,982,457 | 5/1961 | D'Alelio | 220—83X |
| 2,956,915 | 10/1960 | Korn et al. | 161—182X |
| 3,002,534 | 10/1961 | Noland | 138—141 |
| 3,023,495 | 3/1962 | Noland | 220—3X |
| 3,296,802 | 1/1967 | Williams | 220—3X |
| 3,381,818 | 5/1968 | Cope et al. | 206—84 |
| 3,452,503 | 7/1969 | Miller | 220—3X |
| 3,463,350 | 8/1969 | Unger | 220—83 |
| 2,601,525 | 6/1952 | Howald et al. | 220—63 |
| 2,715,085 | 8/1955 | Boger | 220—63X |
| 2,779,702 | 1/1957 | Wilson et al. | 220—63 |
| 2,984,593 | 5/1961 | Isaksen et al. | 161—402X |
| 3,400,041 | 9/1968 | Rasmussen | 161—402X |
| 3,455,720 | 7/1969 | Davies et al. | 161—402X |
| 3,475,248 | 10/1969 | Brasure | 106—402X |
| 2,601,525 | 6/1952 | Howald et al. | 220—63 |
| 2,715,085 | 8/1955 | Boger | 220—63X |
| 2,779,702 | 1/1957 | Wilson et al. | 220—63 |
| 3,238,087 | 3/1966 | Norwalk et al. | 161—185 |

HAROLD ANSHER, Primary Examiner

U.S. Cl. X.R.

161—183, 227, 252, 402; 206—84; 220—83; 280—5